F. H. SCHROEDER.
KITCHEN CABINET.
APPLICATION FILED APR. 18, 1919.
1,346,470.
Patented July 13, 1920.
2 SHEETS—SHEET 1.
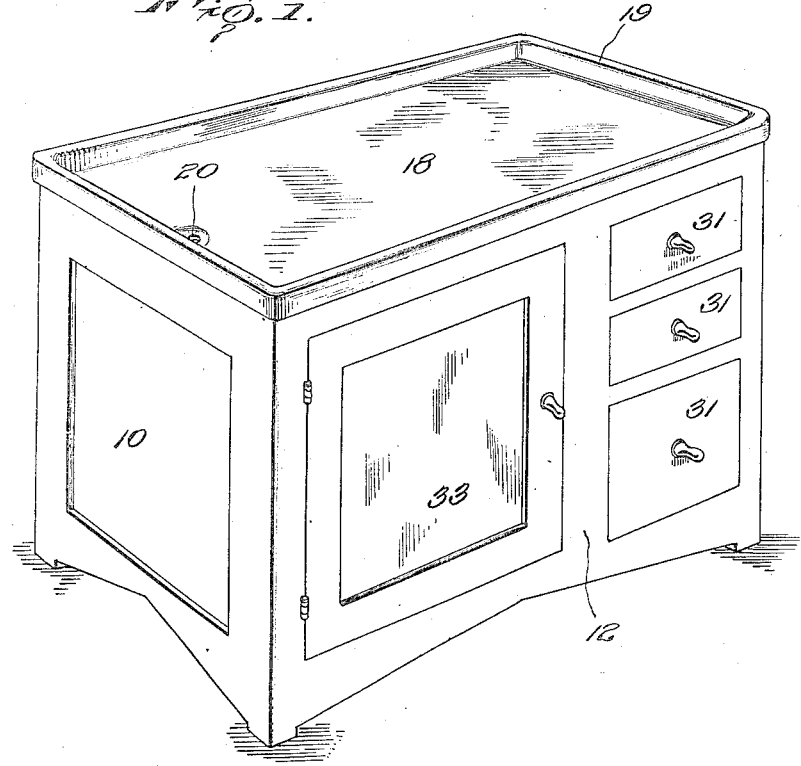
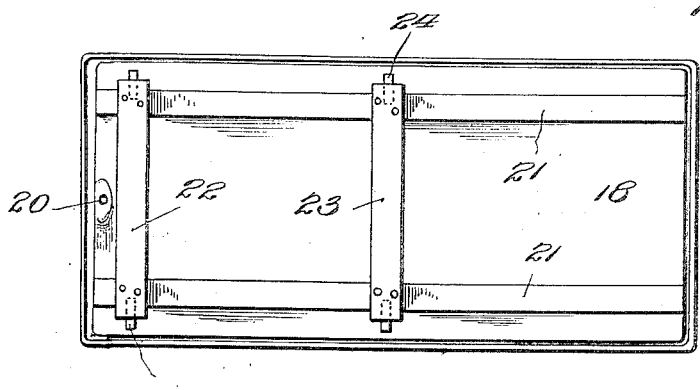
INVENTOR.
F. H. Schroeder.

F. H. SCHROEDER.
KITCHEN CABINET.
APPLICATION FILED APR. 18, 1919.
1,346,470.
Patented July 13, 1920.
2 SHEETS—SHEET 2.
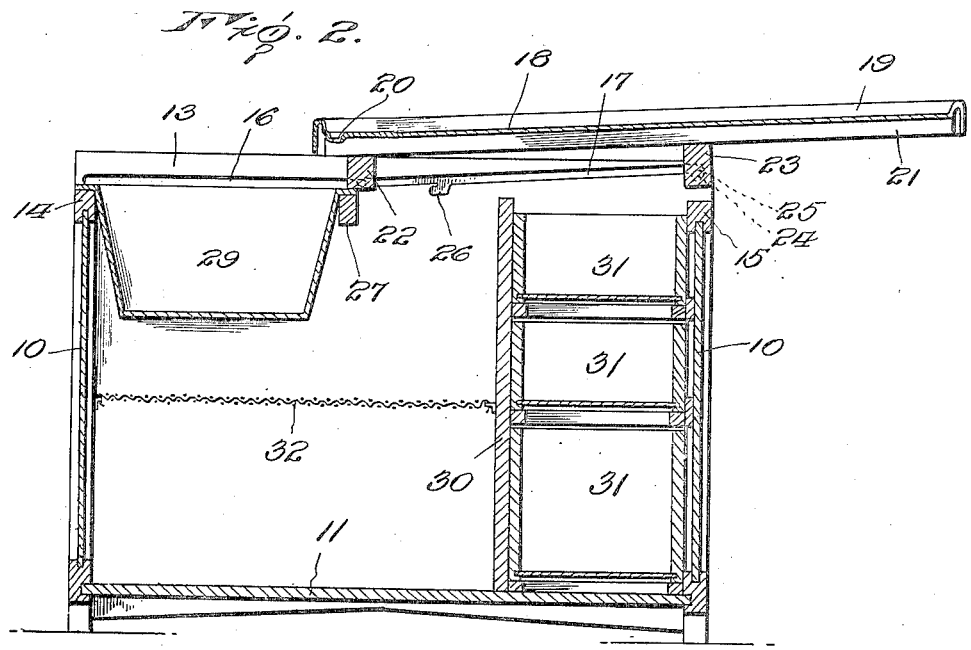
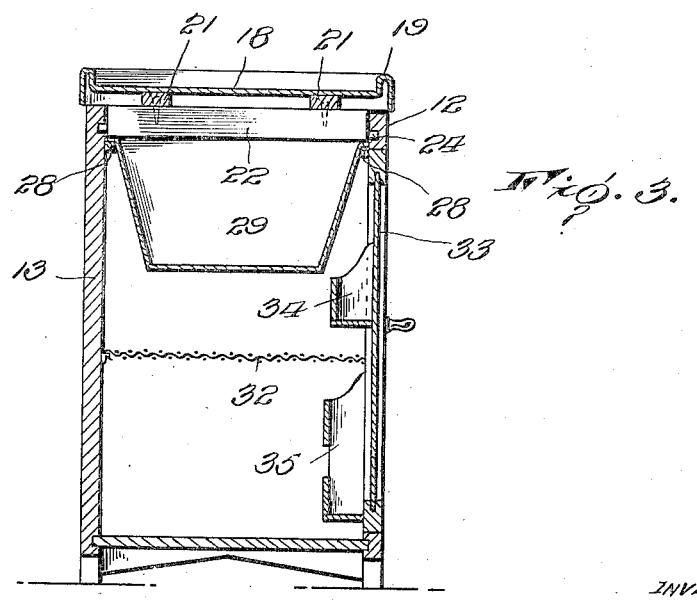
INVENTOR.
F. H. Schroeder.
by Lacy Lacy,
Attys.

UNITED STATES PATENT OFFICE.

FRANK H. SCHROEDER, OF RICHMOND, INDIANA, ASSIGNOR OF ONE-HALF TO RICHARD E. EDWARDS, OF RICHMOND, INDIANA.

KITCHEN-CABINET.

1,346,470.  Specification of Letters Patent.  Patented July 13, 1920.

Application filed April 18, 1919. Serial No. 290,943.

*To all whom it may concern:*

Be it known that I, FRANK H. SCHROEDER, citizen of the United States, residing at Richmond, in the county of Wayne and State of Indiana, have invented certain new and useful Improvements in Kitchen-Cabinets, of which the following is a specification.

This invention relates to an improved kitchen cabinet and has as one of its principal objects to provide a simple and compact device of this character which, in practical use, will prove of maximum utility, will be convenient, and will be neat in appearance.

The invention has as a further object to provide a cabinet which, under ordinary circumstances, may be used as a table and wherein the cabinet will be equipped with a porcelain covered sheet metal top so that this top will thus provide a porcelain top for the table.

A further object of the invention is to provide a cabinet having a removable pan normally housed therein and wherein the top of the cabinet may be shifted to a position exposing this pan so that dishes may be washed in the pan while the cabinet top will serve as a drain-board for directing the water dripping from the dishes back into the pan.

The invention has as a further object to provide a cabinet wherein the top will normally be locked closed and will also, when shifted to expose the pan, be locked in open position.

And the invention has as a still further object to provide a cabinet which will be formed with a convenient cupboard and will also comprise a plurality of drawers.

Other and incidental objects will appear hereinafter.

In the drawings:

Figure 1 is a perspective view of my improved cabinet,

Fig. 2 is a longitudinal sectional view taken centrally through the device and showing the top of the cabinet open, Fig. 3 is a transverse sectional view, the top being closed, and Fig. 4 is a bottom plan view showing the top detached.

In carrying the invention into effect, I employ a preferably oblong cabinet body which includes end walls 10, a bottom wall 11, a front wall 12, and a back wall 13. The cabinet body is preferably formed of wood and these several walls may be secured together in any approved manner. At the upper edges of the end walls are transverse rails which, for convenience, have been indicated at 14 and 15 respectively. Formed in the upper margins of the front and back walls are grooves 16 having inclined portions 17. The top of the cabinet is indicated at 18. This top is preferably what is generally known as a porcelain top, or enameled sheet metal, and is provided with a rolled rim 19 upstanding from the body of the top. At one end of the top the body thereof is, as particularly shown in Fig. 1, formed with a medial drain opening 20. Secured to the body of the top at its lower side are spaced longitudinal strips 21 and fastened to these strips are spaced cross bars which, for convenience, have been indicated at 22 and 23 respectively. Projecting from the ends of these cross bars are suitable pins or trunnions 24 and, as will now be observed upon reference to Fig. 3, these trunnions engage within the grooves 16 for slidably supporting the top 18 upon the cabinet body. Thus, it will be seen that the top may be moved endwise to open position as illustrated in Fig. 2, while normally, the top will, as shown in Fig. 1, rest in closed position overlying the upper end of the cabinet body. Communicating with the outer ends of the grooves 16 are notches 25, and, as will be noted, the trunnions of the cross bar 23 are adapted to engage in these notches for locking the top in open position. Similar slots 26 communicate with the inclined portions 17 of the grooves and, as will be readily understood, the trunnions of the cross bar 23 are also adapted to engage within these latter slots for locking the top closed.

Extending transversely between the front and back walls 12 and 13 of the cabinet body is a cross piece 27 which is arranged in spaced parallel relation to the top rail 14 of the adjacent end wall 10. Connected to the front and back walls 12 and 13 are cleats 28 and engaging over these cleats as well as over the rail 14 and cross piece 27 is the upper marginal flange of a pan 29 removably fitted within the cabinet body. This pan may be of any approved character and is particularly designed for the washing of dishes. As will be readily seen upon reference to Fig. 2, the top 18 of the cabinet may be opened when dishes may be washed within the pan 29 and the washed dishes laid upon the top to drain. Thus, since the top when open, will be supported to incline toward the pan, water dripping from the dishes will be collected within the top to finally drain through the opening 20 and run back into the pan. The top will thus provide an effective drain board for the dishes and, owing to the provision of the rolled rim upon the top, water may, without wasting, be poured over the dishes for rinsing the dishes.

Extending transversely within the cabinet body is a partition 30 dividing the cabinet body into a drawer compartment and a cupboard compartment. Slidably mounted within the drawer compartment is a plurality of drawers 31. The cupboard compartment is provided with a medial shelf 32 which is preferably formed of screen wire. This shelf is, of course, designed to receive cooking utensils placed within the cupboard. Closing the cupboard at its front side is a door 33. This door preferably carries at its inner side, a space can rack 34 and a pan rack 35.

Having thus described the invention, what is claimed as new is:

1. A cabinet including a cabinet body having front and back walls provided with grooves therein and having slots communicating with said grooves, a top normally overlying the cabinet body in closed position, and means fitting in said grooves and slidably connecting the top with the cabinet body, the top being movable toward one end of the cabinet body to open position and said means being adapted to engage in said slots selectively for locking the top in open and closed positions.

2. A cabinet including a cabinet body having side walls provided with top supporting means extending longitudinally of the side walls and having a straight horizontal portion and a straight inclined portion sloping in the direction of one end of the cabinet body, and a substantially flat rigid top supported by said means and normally sustained in horizontal position by the horizontal portion of said means closing the cabinet body, the top being movable to open position inclining longitudinally toward the cabinet body sustained by the inclined portion of said means.

3. A cabinet including a cabinet body, a pan mounted therein, and a top normally overlying the cabinet body in closed position but movable to extended position tilted longitudinally to incline toward the pan, the top being formed adjacent one end with an opening whereby when the top is extended water upon the top will drain through said opening into the pan.

4. A cabinet including a cabinet body having confronting walls provided with grooves having horizontal portions and inclined portions, a top, and means slidably connecting the top with the cabinet body and engaging in said grooves, said means normally coacting with the horizontal portions of the grooves for supporting the top in horizontal closed position and being shiftable to coact with the inclined portions of the grooves for supporting the top in extended position tilted longitudinally to incline toward the cabinet body.

In testimony whereof I affix my signature.

FRANK H. SCHROEDER. [L. S.]